Patented Feb. 25, 1947

2,416,440

UNITED STATES PATENT OFFICE 2,416,440

POLYMERIZATION OF BUTADIENE-1,3 HYDROCARBONS

Charles F. Fryling, Akron, Ohio, assignor to The B. F. Goodrich Company, New York, N. Y., a corporation of New York No Drawing. Application February 23, 1944, Serial No. 523,575

3 Claims. (Cl. 260—86.5)

This invention relates to the polymerization in aqueous emulsion of butadiene-1,3 hydrocarbons, or mixtures thereof with other unsaturated compounds copolymerizable therewith in aqueous emulsion, to produce rubbery or resinous copolymers, and particularly to a method of conducting such polymerizations whereby rubbery polymers and copolymers, or synthetic rubber, of high quality may be produced in a very short time.

In the polymerization in aqueous emulsion of butadiene-1,3 hydrocarbons or mixtures thereof with other unsaturated compounds called co-monomers, such as styrene and acrylonitrile, it is common practice to employ a compound of the class well-known to the art as "modifiers for butadiene-1,3 hydrocarbon polymerization" in the emulsion during the polymerization in order that commercially useful, plastic and soluble rubbery products resembling unvulcanized natural rubber rather than tough, unworkable materials resembling vulcanized rubber may be obtained. It has been found, however, that polymerizations effected in the presence of modifiers are often not as rapid as is possible in their absence, and that this is particularly the case when modifiers which are sulphur-containing organic compounds possessing between 4 and 16 carbon atoms are used.

I have now discovered that the polymerization of butadiene-1,3 hydrocarbons effected in aqueous emulsion in the presence of these sulphur-containing modifiers possessing from 4 to 16 carbon atoms is greatly accelerated by also including in the emulsion during the polymerization an aliphatic mercaptan containing from 16 to 26 carbon atoms. By this method of procedure it is possible not only to produce the highest quality synthetic rubber, but also to carry out the polymerization at the fastest possible polymerization rate.

Although the use of aliphatic mercaptans generally in the polymerization of butadiene-1,3 hydrocarbons for the purpose of modifying the polymerizations has heretofore been suggested, it has been found that as the length of the carbon chain of the mercaptan is increased, the mercaptan becomes less efficient as a modifier to the extent that in the case of mercaptans containing from 16 to 26 carbon atoms, the modifying action is insufficient to assure the attainment of products resembling unvulcanized natural rubber. Accordingly, little modification of polymer properties, if any, is obtained by polymerizing in the presence of a mercaptan containing from 16 to 26 carbon atoms, as the sole polymerization modifier.

In this invention, however, a 16 to 26 carbon atom aliphatic mercaptan is employed with another sulphur-containing modifier possessing between 4 and 16 carbon atoms, and it is found, unexpectedly, that the function of the 16 to 26 carbon atom mercaptan is to accelerate or speed up the polymerization and not that of a modifier.

Any aliphatic mercaptan containing from 16 to 26 carbon atoms may be employed in this invention. Suitable mercaptans of this type are, for example, cetyl mercaptan, which is the preferred material, octadecyl mercaptan, tri-hexyl mercaptan, tri-isoheptyl mercaptan, tetracosinyl mercaptan, ceryl mercaptan, and the like. Mixtures of mercaptans whose average molecular weight correspond to from 16 to 26 carbon atoms, such as, for example, the mercaptans prepared from hydrocarbon fractions containing an average of about 18 carbon atoms and similar mercaptan mixtures whether prepared from fatty alcohol mixtures or from hydrocarbon mixtures, may also be employed. All these mercaptans possess the general formula R—S—H, wherein R is an aliphatic hydrocarbon radical, which may be either saturated or unsaturated, normal, secondary or tertiary, and containing from 16 to 26 carbon atoms.

The modifier of polymerization employed with these alphatic marceptans, according to the method of this invention may be any sulphur-containing organic compound possessing between 4 and 16 carbon atoms which is known to improve the plasticity and solubility of butadiene polymers and copolymers prepared in their presence. In general, the sulphur-containing organic compounds possessing this property of modification, in addition to containing between 4 and 16 carbon atoms, possess at least one divalent sulphur atom, which is not a part of a ring structure, and which is connected by its two valences to two different atoms, at least one of which is a carbon atom. In other words, modifiers for butadiene-1,3 hydrocarbon polymerization are generally sulphur-containing compounds possessing the characteristic structure C—S—X, wherein X is any atom capable of forming a univalent bond with a divalent sulphur atom, and C and X are not joined together in a ring structure. While X in this structure is ordinarily a non-metallic atom such as another carbon or an hydrogen, nitrogen, sulphur or phosphorous atom; in some types of compounds, it may also be a metallic atom. However, in the most effective modifiers X in the above structure is hydrogen or sulphur or a doubly bound non-metallic atom such as a carbon atom present in a carbonyl or thiono group; and also in many cases the carbon atom in the above structure is also a doubly bound carbon atom, such as the carbon of a thiono group.

One particularly important class of modifiers for use in this invention consists of the xanthogenic acids and particularly the salts, esters and sulfides derived therefrom, containing between 4 and 16 carbon atoms. This class of modifiers, referred to herein as "xanthogen modifiers," includes compounds of the following types:

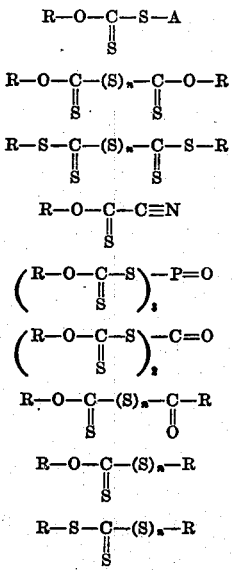

Wherein R is a univalent organic residue having its univalent bond on a carbon atom such as an aliphatic, aromatic, alicyclic or heterocyclic radical; A is hydrogen or a base-forming radical such as an alkali metal or an ammonium or substituted ammonium group and $n$ is a small integer say from 1 to 4. Of these types of compounds the dialkyl dixanthogens or bis-(alkyl xanthogens) containing between 4 and 16 carbon atoms, i. e., compounds of the formula:

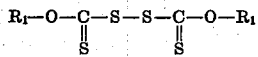

wherein $R_1$ is an alkyl group containing from 1 to 7 carbon atoms, examples of which are bis-(isopropyl xanthogen), bis-(n-butyl xanthogen), etc., are particularly preferred. Examples of other compounds of these types include:

Ethylxanthogenyl monosulfide
Isopropyl thioxanthogenyl monosulfide
Isopropylxanthogenyl tetrasulfide
Bis-(tetrahydrofurfuryl xanthogen)
Ethyl thioxanthogenyl trisulfide
Tri-isopropylxanthogenyl trithiophosphate or tris-(isopropoxythiono) trithiophosphate (reaction product of sodium isopropyl xanthate and phosphorous oxychloride)
Tri-ethylxanthogenyl tetrathiophosphate or tris-(ethoxythiono) tetrathiophosphate (reaction product of sodium xanthate and phosphorous thiochloride)
Isopropylxanthogenyl thiocyanate or isopropoxy-thiono cyano monosulfide (reaction product of sodium isopropyl xanthate and cyanogen chloride)
Isopropylxanthogenyl benzoyl monosulfide or isopropoxy thiono benzoyl monosulfide (reaction product of sodium isopropyl xanthate and benzoyl chloride)

Di-isopropylxanthogenyl dithiocarbonate or bis-(isopropoxythiono) dithiocarbonate (reaction product of sodium isopropyl xanthate and phosgene)

Another important class of modifiers for use in this invention consists of the mercaptans or thiols containing between 4 and 16 carbon atoms which, as has been noted hereinabove, are to be distinguished from the mercaptans containing from 16 to 24 carbon atoms in their effect upon the polymerization of butadiene-1,3 hydrocarbons. Included in this class of mercaptans in general are all mercaptans containing between 4 and 16 carbon atoms and possessing the formula R—S—H, where R is the same as defined hereinabove. In the aliphatic mercaptans, which are the most useful mercaptan modifiers, the aliphatic group may be primary, secondary or tertiary, saturated or unsaturated and may contain, in addition to the carbon and hydrogen various substituents, such as nitro, chloro, alkoxy and amino groups. Aliphatic mercaptans wherein the aliphatic group is an alkyl group containing between 4 and 10 carbon atoms are preferred for use in this invention. The following are examples of the preferred aliphatic mercaptans, and of various other mercaptan modifiers:

n-Octyl mercaptan
Isoheptyl mercaptan
Lauryl mercaptan
Tri-isobutyl mercaptan
Thiobeta-naphthol
2-methyl hexanethiol-2
Pinene mercaptan
Benzyl mercaptan
Dodecenyl mercaptan
B-mercapto ethyl benzyl ether
Mercaptobenzothiazole
4-phenyl-2-mercapto thiazole While the above described xanthogen modifiers and mercaptan modifiers have been found to be the most useful in this invention, other sulphur-containing compounds of the character described, including various organic sulfides, disulfides and polysulfides, thioic acids, dithioic acids, thiocarbamic acids and their salts, esters and sulfides are also polymerization modifiers, and may, if desired, be employed. The following compounds are examples of such other sulphur-containing modifiers:

Diphenyl disulfide
Dibenzoyl disulfide
Tetramethyl thiuram disulfide
Dibenzothiazyl disulfide
Tolyl trisulfide
Thiobenzoic acid
Sodium dimethyl dithiocarbamate
4-phenyl-thiazyl-2-disulfide
Benzoyl ethyl sulfide
Dimethylammonium dimethyl dithiocarbamate Both an aliphatic mercaptan containing from 16 to 26 carbon atoms and a sulphur-containing modifier possessing between 4 and 16 carbon atoms are employed according to this invention in the polymerization in aqueous emulsion of butadiene-1,3 hydrocarbons, the effect being that the 16 to 26 carbon atom aliphatic mercaptan accelerates the polymerization, while the sulphur-containing compound possessing between 4 and 16 carbon atoms functions as the polymerization modifier.

This method of polymerization is applicable to any butadiene-1,3 hydrocarbon, such as butadiene-1,3, isoprene, 2,3-dimethyl butadiene-1,3, piperylene, and the like either alone or in admixture in any suitable proportion with one or more unsaturated compounds copolymerizable therewith in aqueous emulsion. Compounds copolymerizable with butadiene-1,3 hydrocarbons in aqueous emulsion include other butadiene-1,3 hydrocarbons, other conjugated dienes such as chloroprene, 2-cyano-butadiene-1,3 and the like, and copolymerizable mono-olefinic compounds such as styrene, vinyl naphthalene, para-chloro styrene, para-methoxy styrene and other aryl olefins; acrylonitrile, methacrylonitrile, alpha-chloro acrylonitrile, methyl acrylate, methyl methacrylate, ethyl methacrylate, allyl methacrylate, methyl alpha-chloro acrylate, acrylic acid, methacrylic acid, acrylamide, methacrylamide and other polymerizable acrylic compounds; vinyl ketone, methyl isopropenyl ketone, methyl vinyl ether, methyl ethynyl carbinol, diethyl fumarate, diallyl maleate, vinylidene chloride, vinyl acetate, vinyl pyridine, isobutylene, and the like. When mixtures of butadiene-1,3 hydrocarbons with such copolymerizable compounds are employed, it is preferable that the butadiene-1,3 hydrocarbons be present in a predominant amount, that is, to the extent of at least 50% by weight of the mixture.

In the practice of the invention the monomeric materials to be polymerized are first emulsified with an aqueous solution containing a suitable emulsifying agent. Emulsifying agents which may be employed for this purpose include soaps of fatty acids, rosin acids and dehydrogenated rosin acids, as well as other saponaceous materials including alkali metal alkyl sulfates, alkali metal alkaryl sulfonates and salts of high molecular weight bases.

The monomeric materials while so emulsified are then polymerized by agitating the emulsion at a temperature of 20 to 100° C. for a period of time necessary to convert from about 75 to 100% of monomeric material into polymers, this being effected in about five to twenty hours, the polymerization being terminated if desired at the desired conversion of monomer into polymer by adding to the emulsion a polymerization inhibitor such as hydroquinone or phenyl-beta naphthylamine. The products are obtained in the form of an aqueous dispersion resembling natural rubber latex, which may be used as such or coagulated to yield the massive polymers.

The presence of a mercaptan containing from 16 to 26 carbon atoms and a sulphur-containing modifier containing between 4 and 16 carbon atoms in the emulsion during the polymerization is, of course, essential to this invention. While it is preferred that these materials be added to the emulsion prior to the beginning of the polymerization, it is also within the scope of the invention to add a part or all of either or both of these materials to the emulsion in stages or continuously during the time that the polymerization is taking place. For example, the addition of the mercaptan containing from 16 to 24 carbon atoms prior to the polymerization with the addition of a part of the modifier during the polymerization is in many instances to be desired, since the presence of the mercaptan, which accelerates the polymerization, is desirable at the very beginning, while the presence of a portion of the modifier at all stages of the polymerization is to be desired.

The amount of the mercaptan and the modifier to be employed is not critical and may be varied widely. In general, however, it is desirable to employ about 0.1 to 1% by weight based on the weight of the material polymerized of each of these materials, preferably with the ratio of mercaptan to modifier ranging from about ¼ to 1 to about 4 to 1.

It is also desirable to employ a polymerization initiator in the emulsion during the polymerization. The preferred initiators are hydrogen peroxide, and potassium persulfate, although other per-oxygen compounds, including benzoyl peroxide, sodium perborate and other per-salts, as well as still other types of initiators such as diazoamino benzene, may also be employed. The initiator is customarily added to the emulsion prior to the polymerization, but in the event hydrogen peroxide is employed and the temperature of polymerization is above about 40° C., it may be desirable to add the hydrogen peroxide to the emulsion in stages during the course of the polymerization. Other substances including polymerization catalysts such as simple and complex heavy metal salts and various other catalysts and promoters as well as other substances useful for other purposes, may also be present in the emulsion.

In order further to illustrate the method of practicing the invention and the advantages to be attained thereby, the following examples are cited, but it is to be understood that the invention is not to be limited by the details therein set forth. The parts are by weight:

*Example I*

A mixture consisting of 70 parts of butadiene-1,3 and 30 parts of styrene is mixed with 0.2 part of bis-(isopropyl xanthogen) and with 0.9 part of cetyl mercaptan, and is then emulsified with an aqueous solution containing 180 parts of water, 5 parts of fatty acid soap as an emulsifying agent, 0.3 part of hydrogen peroxide as a polymerization initiator, and .05 part of a catalyst mixture comprising complex pyrophosphates of iron and cobalt. The emulsified monomers are then allowed to polymerize by agitating the emulsion at a temperature of 40° C. for fourteen hours, at the end of which time the latex obtained is coagulated to yield the rubbery, butadiene styrene copolymer obtained as the product of the polymerization.

It is found that the polymerization has proceeded to 88% conversion, that is, an 88% yield of polymer based on the monomers is obtained in 14 hours at 40° C., and that the rubbery copolymer obtained is quite plastic and easily milled, having a Goodrich plasticity of about 90 at 100° C., and is substantially completely soluble in benzene. When the copolymer is compounded in a typical tire-tread test recipe and vulcanized for 45 minutes at 310° F., it is found to possess a tensile strength of 4,900 lbs. per sq. in., and an ultimate elongation of 770%.

When the above example is repeated except that no cetyl mercaptan is employed, the polymerization proceeds only to 65% conversion after 14 hours at 40° C. The product obtained possesses substantially the same plasticity and solubility, and when vulcanized in the same manner, possesses a tensile strength of 4,615 lbs. per sq. in., and an ultimate elongation of 715%, thus showing that the presence of the cetyl mercaptan together with the xanthogen remarkably increased the rate of polymerization (from 65% to 88% conversion) without adversely affecting the quality of the product.

On the other hand, when the above example is repeated except that no bis-(isopropyl xanthogen) is employed, the product obtained is deficient in plasticity and solubility, being only about 20% soluble in benzene, and when vulcanized in the same manner possesses a tensile strength of only 3,225 lbs. per sq. in., and an ultimate elongation of only 400%.

In the absence of both the bis-(isopropyl xanthogen) and the cetyl mercaptan, the polymerization proceeds to 70% conversion in 14 hours. The product is deficient in plasticity and solubility, and when vulcanized possesses a tensile strength of 3,275 lbs. per sq. in. and a 375% elongation.

It is thus seen that plastic soluble products possessing high tensile strength are obtained in high yields in a short time, when both cetyl mercaptan and a xanthogen compound are present during the polymerization, whereas this result is not achieved in the absence of either or both of these compounds. It is also to be seen that the presence of cetyl mercaptan remarkably accelerated the polymerization, polymerization in the presence of this compound being faster than that when no sulphur-containing compound is present in the emulsion.

Example II

The polymerization of Example I is repeated except that 0.3 part of bis-(isopropyl xanthogen) and 0.3 part of cetyl mercaptan are employed in the emulsion, except that 0.3 part of potassium persulfate is employed in place of hydrogen peroxide as the polymerization initiator, and except that the catalyst mixture is not included in the emulsion. The polymerization is about 80% complete in 14 hours and the product is a plastic, soluble synthetic rubber which may be vulcanized to give strong resilient vulcanizates. With 0.6 part of bis-(isopropyl xanthogen) alone and no cetyl mercaptan, a similar polymerization is very slow requiring over 50 hours for 80% conversion. On the other hand when 0.6 part of cetyl mercaptan alone and no bis-(isopropyl xanthogen) is employed in a similar polymerization, the product obtained is not a suitable synthetic rubber being relatively non-plastic, only about 20% soluble in benzene and yielding only weak vulcanizates.

Example III

The polymerization of Example I is again repeated except that 0.6 part of bis-(isopropyl xanthogen) and 0.5 part of cetyl mercaptan are employed in the emulsion, and the peroxide employed as the initiator is added in stages during the polymerization. After 10 hours at 50° C. the polymerization is terminated, and it is found that a 95.2% yield of a butadiene styrene copolymer having a tensile strength of from 4,000 to 5,000 lbs. per sq. in. and an elongation of from 600 to 700% is obtained. When the example is repeated except that no cetyl mercaptan is employed, only an 86% yield of polymer is obtained in ten hours, thus showing that the presence of the ceyl mercaptan remarkably accelerated the polymerization enabling high yield of an excellent product to be obtained in only a 10-hour polymerization time.

Example IV

The polymerization of butadiene-1,3 and styrene in an aqueous emulsion similar to that of Example I is carried out employing 0.1 part of bis-(isopropoxy thiono) cyano monosulfide as the modifier, and 0.5 part of a mixture of mercaptans containing an average of about 18 carbon atoms is employed as the aliphatic mercaptan. A 79% yield of a polymer of the same excellent quality as that obtained in Example I is produced in only 12 hours, although in the absence of the higher mercaptan the polymerization was only 64% complete in 12 hours.

Example V

The polymerization of Example I is again repeated using 0.3 part of octyl mercaptan as a modifier and 0.3 part of octadecyl mercaptan as the higher aliphatic mercaptan. After 10½ hours at 40° C. the polymerization is 80% complete, and the product is an excellent butadiene styrene synthetic rubber. In the absence of the octadecyl mercaptan the octyl mercaptan inhibits the polymerization to such an extent that the polymerization is only about 50% complete in 10½ hours.

I claim:

1. The method which comprises polymerizing in aqueous emulsion a mixture of butadiene-1,3 and an unsaturated compound copolymerizable therewith in aqueous emulsion, in the presence of bis-(isopropyl xanthogen), and also in the presence of cetyl mercaptan.

2. The method which comprises polymerizing in aqueous emulsion a mixture of butadiene-1,3 and styrene in the presence of bis-(isopropyl xanthogen) and cetyl mercaptan.

3. The method which comprises polymerizing in aqueous emulsion a butadiene-1,3 hydrocarbon in the presence of a bis-(alkyl xanthogen) containing between 4 and 16 carbon atoms and possessing the formula

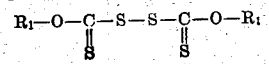

wherein $R_1$ is an alkyl group containing from 1 to 7 carbon atoms, and also in the presence of cetyl mercaptan.

CHARLES F. FRYLING.

REFERENCES CITED

The following references are of record in the file of this patent:

UNITED STATES PATENTS

| Number | Name | Date |
|---|---|---|
| 2,281,613 | Wollthan | May 5, 1942 |
| 2,378,030 | Olin | June 12, 1945 |
| 2,401,346 | Fryling | June 4, 1946 |